United States Patent
Yui

(10) Patent No.: US 7,245,676 B2
(45) Date of Patent: Jul. 17, 2007

(54) ADAPTIVE EQUALIZER

(75) Inventor: Tomohiro Yui, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 617 days.

(21) Appl. No.: 10/807,192

(22) Filed: Mar. 24, 2004

(65) Prior Publication Data

US 2004/0196896 A1    Oct. 7, 2004

(30) Foreign Application Priority Data

Apr. 3, 2003    (JP)    ............................. 2003-100210

(51) Int. Cl.
*H04L 27/06*    (2006.01)
*H03H 7/40*    (2006.01)
(52) U.S. Cl. ..................................... 375/343; 375/232
(58) Field of Classification Search ........ 375/229–234, 375/316, 343, 350, 347, 267, 140, 150, 142, 375/130; 708/422, 300, 322, 323
See application file for complete search history.

(56) References Cited

U.S. PATENT DOCUMENTS

| | | | |
|---|---|---|---|
| 5,251,237 A | 10/1993 | Baier | |
| 5,317,595 A | 5/1994 | Ostman | |
| 6,002,716 A | 12/1999 | Meyer et al. | |
| 6,021,161 A | 2/2000 | Yamaguchi et al. | |
| 6,044,104 A | 3/2000 | Watanabe | |
| 6,347,391 B1 | 2/2002 | Uesugi et al. | |
| 6,434,192 B1 | 8/2002 | Aizawa et al. | |
| 6,678,230 B2 | 1/2004 | Miyashita et al. | |
| 2002/0051487 A1 | 5/2002 | Yamada et al. | |
| 2002/0181549 A1 | 12/2002 | Linnartz et al. | |

FOREIGN PATENT DOCUMENTS

| | | |
|---|---|---|
| CN | 1351454 | 5/2002 |
| CN | 1404675 | 3/2003 |
| DE | 9614543 | 8/1997 |
| EP | 0496467 | 7/1992 |
| EP | 1-465-378 A2 * | 6/2004 |
| GB | 2268377 | 1/1994 |
| JP | 9-294095 | 11/1997 |
| JP | 11313013 | 11/1999 |
| JP | 11508113 | 12/1999 |
| WO | 97/39536 | 10/1997 |

OTHER PUBLICATIONS

English Language Abstract of JP 11-508113.
English Language Abstract of JP 9-294095.
English Language Abstract of JP 11-313013.
Hirano et al., "DSP Implementation And Performance Evaluation Of Sparse-Tap Adaptive Fir Filters With Tap-Position Control," IEEE International Conference on Acoustics, Speech, and Signal Processing (ICASSP), Atlanta 1996, vol. 3, No. 21, May 7, 1996, pp. 1295-1298.
English language abstract of DE 19614543.
English language abstract of EP 0496467.

* cited by examiner

*Primary Examiner*—Tesfaldet Bocure
(74) *Attorney, Agent, or Firm*—Greenblum & Bernstein, P.L.C.

(57) ABSTRACT

An adaptive equalizer capable of reducing an amount of calculation necessary for signal processing to such a degree that the accuracy of adaptive processing does not deteriorate and thereby reducing power consumption. When the transmission path is in a situation in which the influence of fading is small judging from the previous reception performance, a transmission path situation decision section (106) generates a control signal which causes a correlation window size control section (105) to change a correlation window size, generates a control signal preventing a matrix operator (103) from performing a calculation operation and generates a control signal which causes a selector (104) to select the output of a first correlator (101). As a result, it is possible to reduce the amount of calculation when the situation of the transmission path is relatively good.

3 Claims, 4 Drawing Sheets

ADAPTIVE EQUALIZER

BACKGROUND OF THE INVENTION

1. Field of the Invention

The present invention relates to an adaptive equalizer used principally for a receiver for digital radio communication involving fading.

2. Description of Related Art

In a radio communication receiver, radio waves of a plurality of paths with different propagation times are generally received simultaneously due to influences of multipath fading. For this reason, delay distortion occurs in a received signal and its bit error rate characteristic deteriorates. This delay distortion increases as the symbol rate increases and influences of delay distortion can no longer be ignored in high-speed digital mobile communication devices in the future. Therefore, eliminating delay distortion is becoming indispensable for the digital radio communication receiver.

An adaptive equalizer is conventionally incorporated in a receiver which carries out high-speed transmission as typical means for estimating the delay distortion and is also incorporated in a cellular phone, etc., based on GSM which is a digital cellular phone standard in Europe in recent years.

When equalization is performed on a transmission path in which multi-path fading occurs, transmission data having a training period is used. That is, transmission data is delimited in slot units and a training period is provided at the start of each slot. In this training period, default data called a "training sequence", that is, a transmission signal with a default waveform is inserted. An adaptive equalizer mounted in a receiver makes a comparison with the default data during the training period and estimates the delay distortion. Then, the adaptive equalizer is designed to make a decision on data based on the estimated delay distortion in the part of the slot other than the training period. With reference to FIG. 1, an overview of a conventional adaptive equalizer will be explained below.

FIG. 1 is a block diagram showing a configuration example of a conventional adaptive equalizer. The adaptive equalizer shown in FIG. 1 is basically constructed of a first correlator 1, a second correlator 2 and a matrix operator 3.

The first correlator 1 receives a received signal converted to a baseband signal and a training sequence which is a signal out of the received signal known to the receiver as inputs, calculates a cross-correlation between the two signals and outputs a first correlation value calculated to the matrix operator 3. Here, a correlation sample interval $\tau$ is expressed as $\tau=T/K$, where T is a symbol period and K is an oversampling rate. Furthermore, the correlation window size is L ($L \geq 1$).

The second correlator 2 calculates and stores an inverse matrix of an auto-correlation matrix between the training sequences. Or it calculates and stores an inverse matrix of the auto-correlation matrix beforehand. The calculation result of the second correlator 2 (second correlation value) is output to the matrix operator 3.

Using the output of the first correlator 1 (first correlation value) as a row vector and the output of the second correlator 2 (second correlation value) as a matrix, the matrix operator 3 multiplies this row vector by the matrix and outputs transmission path channel coefficients ($c_1$ to $c_M$) to a reception processing system.

The operation of the conventional adaptive equalizer in the above described configuration will be explained. A transmission path channel impulse response is updated from an input signal based on Expression (1) below:

$$C^T = (\Sigma_{k=[t-L+1, t]} X_k A_k^T) \times (\Sigma_{k=[t-L+1, t]} A_k A_k^T)^{-1} \quad (1)$$

In Expression (1), the first term on the right-hand side denotes the output of the first correlator 1 (cross-correlation between the received signal and training sequence) and the second term on the right-hand side denotes the output of the second correlator 2 (auto-correlation inverse matrix between the training sequences).

In Expression (1), superscript T denotes a matrix transposition operation. Furthermore, a variable $X_k$ with subscript k denotes a sampling value located at time $t=k\tau$ in the slot. L denotes a window size. Furthermore, a variable $A_k$ with subscript k denotes each value at time $t=k\tau$ and is expressed by Expression (2):

$$A_k = (a_k, a_{k-1}, \ldots, a_{k-M+1})^T \quad (2)$$

In Expression (2), $a_k$ denotes a known symbol located at time $t=k\tau$ in the slot.

A transmission path channel impulse response C in Expression (1) is expressed according to Expression (3) using coefficient $c_n$ of the transmission path channel impulse response estimated by the adaptive equalizer:

$$C = (c_1, c_2, \ldots, c_M)^T \quad (3)$$

However, the conventional adaptive equalizer requires matrix multiplication between 1×M matrix and M×M matrix and requires $M^2$ complex multiplications and $M^2$ complex additions. As a result, the amount of calculation increases in proportion to the square of the number of coefficients M of the transmission path channel impulse response calculated, and therefore there is a problem that power consumption increases.

SUMMARY OF THE INVENTION

It is an object of the present invention to provide an adaptive equalizer capable of reducing the amount of calculation necessary for signal processing to such a degree that the accuracy of adaptive processing does not deteriorate and contributing to a reduction of power consumption.

An essence of the present invention is to enable the amount of calculation of adaptive processing to be changed according to the situation of a transmission path and reduce an amount of calculation averagely.

According to an aspect of the invention, an adaptive equalizer comprises a first correlation section that calculates a cross-correlation between inputs of a received signal converted to a baseband signal and a known signal of the received signal which is known to a receiver before the reception, a second correlation section that calculates a correlation inverse matrix created from auto-correlation values obtained between the known signals, a matrix calculation section that receives the output of the first correlation section and the output of the second correlation section as inputs and carries out a matrix multiplication, a selection section that selects the output of the matrix calculation section and the output of the first correlation section, a correlation window size control section that changes the correlation window size of the first correlation section and a transmission path situation decision section that decides the situation of the transmission path from the information indicating the previous reception performance and generates a control signal indicating whether or not to cause the correlation window size control section to change the correlation window size, which output should be selected by the selection section or whether or not to cause the matrix calculation section to carry out a calculation operation.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DESCRIPTION OF THE PREFERRED EMBODIMENT

With reference now to the attached drawings, an embodiment of the present invention will be explained in detail below.

Figure 1:
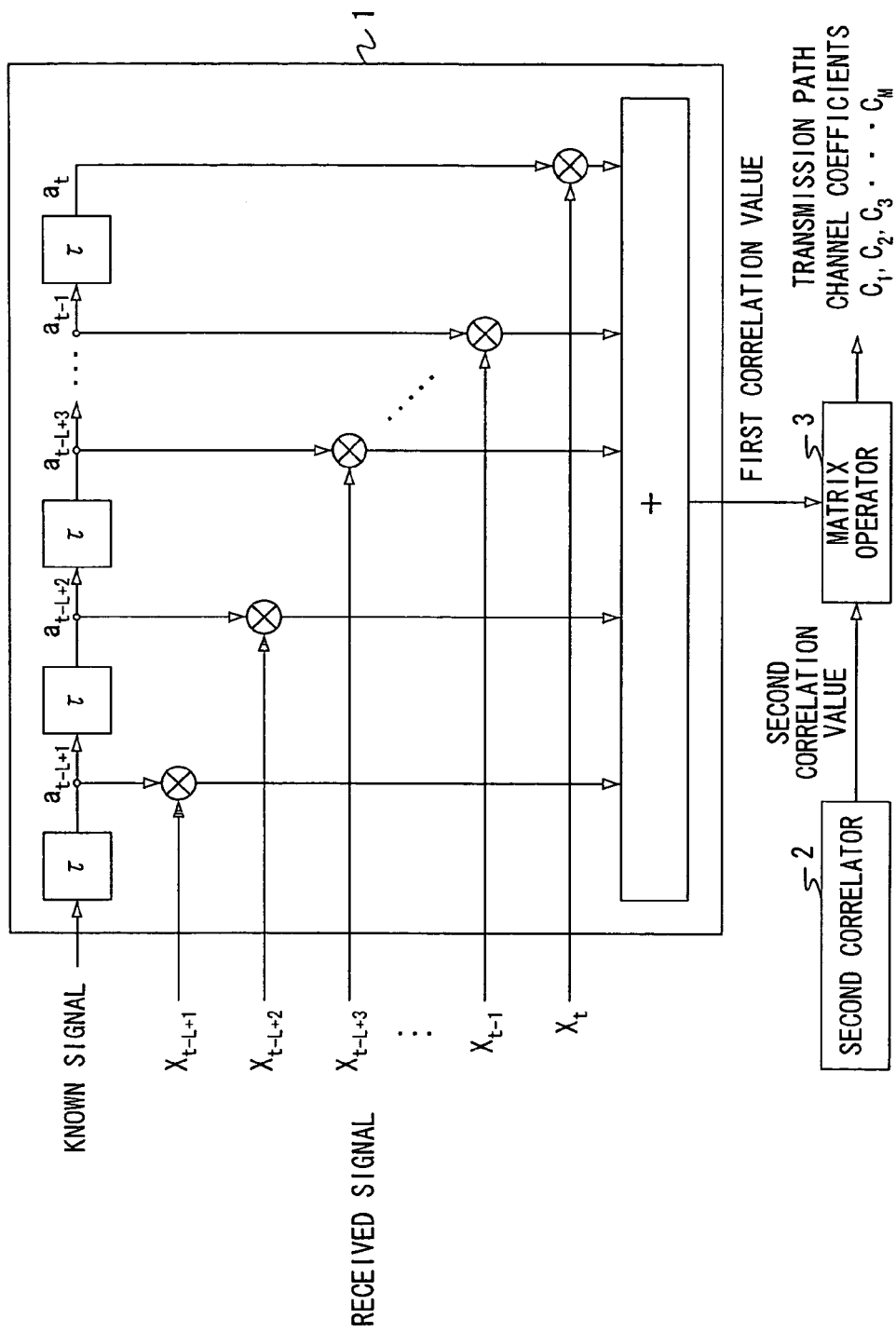
FIG. 1 is a block diagram showing a configuration example of a conventional adaptive equalizer.
Figure 2:
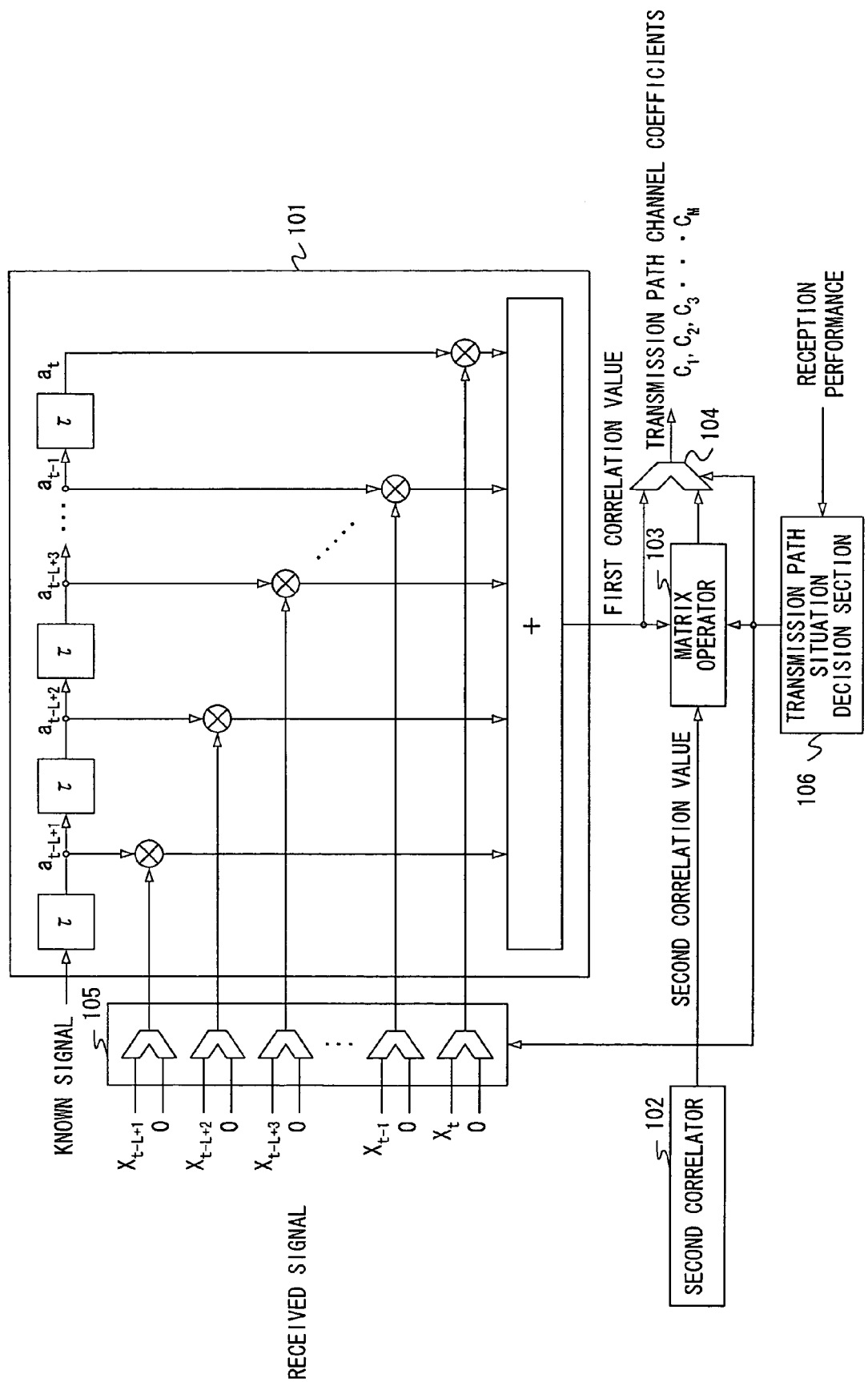
FIG. 2 is a block diagram showing a configuration of an adaptive equalizer according to an embodiment of the present invention.

FIG. 2 is a block diagram showing a configuration of an adaptive equalizer according to an embodiment of the present invention. The adaptive equalizer shown in FIG. 2 is basically constructed of a first correlator 101, a second correlator 102, a matrix operator 103, a selector 104, a correlation window size control section 105 and a transmission path situation decision section 106.

The first correlator 101 receives a received signal converted to a baseband signal and a training sequence which is a signal out of the received signal known to the receiver as inputs, calculates a cross-correlation between the two signals and outputs a first correlation value calculated to a matrix operator 103. Here, a correlation sample interval $\tau$ is expressed as $\tau=T/K$, where T is a symbol period and K is an oversampling rate. Furthermore, the correlation window size is L (L≧1).

The second correlator 102 calculates and stores an inverse matrix of an auto-correlation matrix between the training sequences. Or it calculates and stores an inverse matrix of the auto-correlation matrix beforehand. The calculation result of the second correlator (second correlation value) is output to the matrix operator 103 and the selector 104.

Using the output of the first correlator 101 (first correlation value) as a row vector and the output of the second correlator 102 (second correlation value) as a matrix under the control of the transmission path situation decision section 106, the matrix operator 103 multiplies the row vector by the matrix. The multiplication result of the matrix operator 103 is output to the selector 104.

The selector 104 selects the output of the first correlator 101 and the output of the matrix multiplier 103 under the control of the transmission path situation decision section 106 and outputs the selected outputs to the reception processing system as transmission path channel coefficients ($c_1$ to $c_M$).

The correlation window size control section 105 changes the correlation window size of the first correlator 101 under the control of the transmission path situation decision section 106.

The transmission path situation decision section 106 decides the situation of the transmission path based on the information indicating the previous reception performance input from the outside and generates a signal for controlling the matrix operator 103, selector 104 and correlation window size control section 105.

The operation of the adaptive equalizer of this embodiment in the above described configuration will be explained. A transmission path channel impulse response is updated from an input signal based on Expressions (4) and (5) below:

$$C^T = (\Sigma_{k=[t-L+1,\,t]} X_k A_k^T) \times (\Sigma_{k=[t-L+1,\,t]} A_k A_k^T)^{-1} \qquad (4)$$

$$C^T (\Sigma_{k=[t-L'+1,\,t]} X_k A_k^T) \qquad (5)$$

In Expressions (4) and (5), superscript T denotes a matrix transposition operation. Furthermore, a variable $X_k$ with subscript k denotes a sampling value located at time $t=k\tau$ in the slot. Furthermore, L and L' denote a window size.

Furthermore, a variable $A_k$ with subscript k denotes each value at time $t=k\tau$ and is expressed by Expression (6):

$$A_k = (a_k, a_{k-1}, \ldots, a_{k-M+1})^T \qquad (6)$$

In Expression (6), $a_k$ denotes a known symbol located at time $t=k\tau$ in the slot.

A transmission path channel impulse response C in Expressions (4) and (5) is expressed according to Expression (7) using coefficient $c_n$ of the transmission path channel impulse response estimated by the adaptive equalizer:

$$C = (c_1, c_2, \ldots, c_M)^T \qquad (7)$$

Here, the first term on the right-hand side of Expression (4) and the right-hand side of Expression (5) denote the output of the first correlator 101 (cross-correlation between the received signal and training sequence) and the second term on the right-hand side of Expression (4) denotes the output of the second correlator 102 (auto-correlation inverse matrix between the training sequences).

Furthermore, when the second term on the right-hand side is a unit matrix, Expression (4) is equivalent to Expression (5). That is, this means that when the adaptive processing according to Expression (5) is used in a fading environment, the reception performance deteriorates compared to the adaptive processing according to Expression (4).

That is, when the influence of fading is large, the matrix operator 103 is turned ON by a control signal from the transmission path situation decision section 106 and the correlation window size control section 105 is changed for Expression (4) The selector 104 selects the output result of the matrix operator 103 as the transmission path channel impulse response.

Furthermore, when the influence of fading is small, the matrix operator 103 is turned OFF by a control signal from the transmission path situation decision section 106 and the correlation window size control section 106 is changed for Expression (5), that is, to the window size L' whereby the second term on the right-hand side of Expression (4) becomes a unit matrix. The selector 104 selects the output result of the first correlator 101 as the transmission path channel impulse response.

As shown above, according to this embodiment, the transmission path situation decision section 106 decides the influence of fading to select adaptive processing (Expression (4)) as with the conventional adaptive equalizer when the influence of fading is large or select adaptive processing (Expression (5)) according to this embodiment when the influence of fading is small, and therefore it is possible to reduce the amount of calculation averagely without reducing the reception performance to a noticeable level. That is, when the situation of the transmission path is relatively good, this embodiment reduces the amount of calculation, and can thereby reduce the amount of calculation for signal processing averagely according to the situation of the transmission path without reducing the accuracy of adaptive processing significantly.

More specifically, the conventional adaptive equalizer requires $M \times L + M^2$ complex multiplications and $M \times L + M^2$ complex additions. On the contrary, the adaptive equalizer according to this embodiment only requires $M \times L$ complex multiplications and $M \times L$ complex additions under non-fading influences. That is, it is possible to reduce the amount of calculation as the number of times the situation is decided not to be under influences of fading increases. For example, when $M=L$, the amount of calculation is reduced by approximately 50% in terms of computation.

Figure 3:
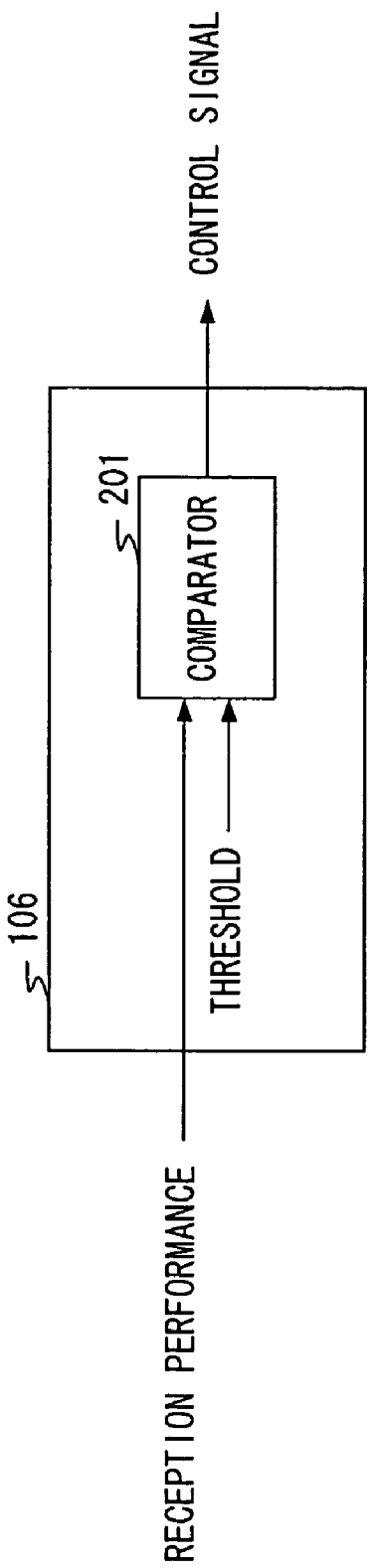
FIG. 3 is a block diagram showing a configuration example of the transmission path situation decision section shown in FIG. 2.
Figure 4:
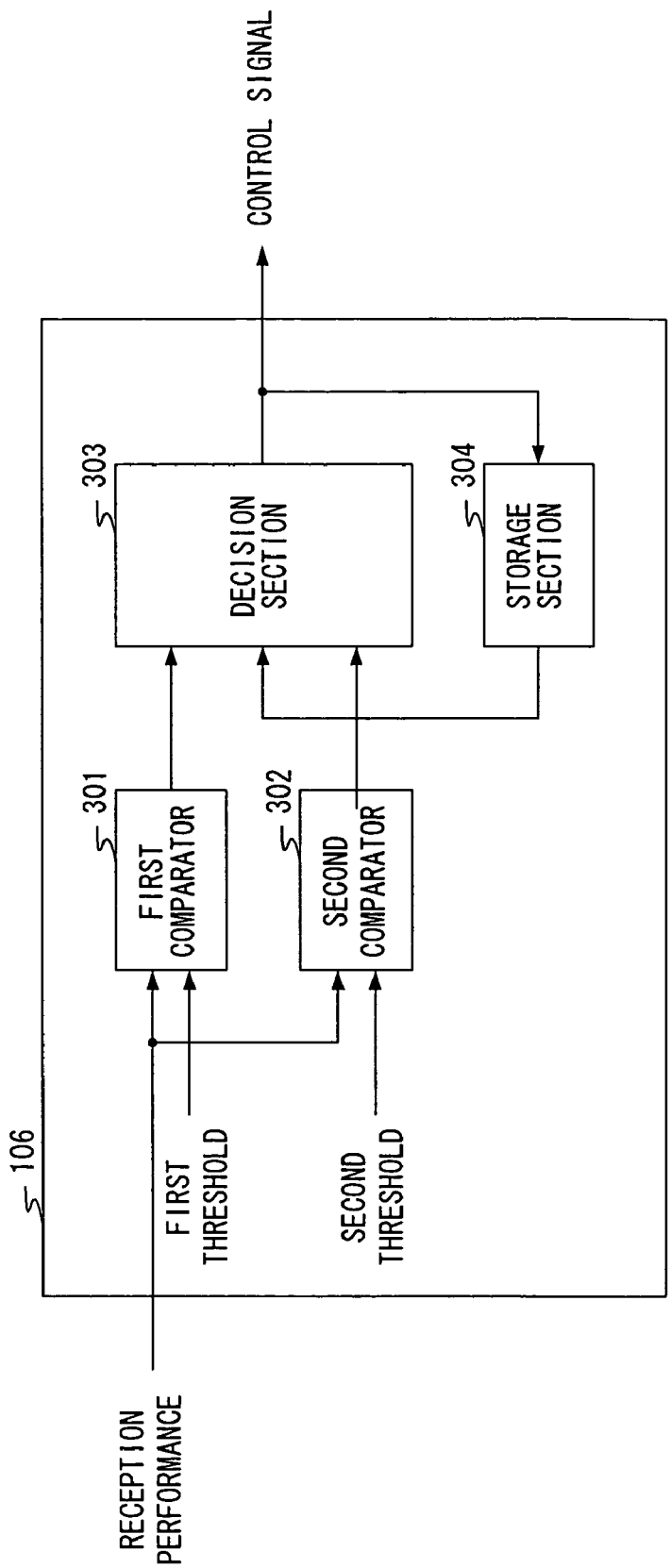
FIG. 4 is a block diagram showing another configuration example of the transmission path situation decision section shown in FIG. 2.

Here, the transmission path situation decision section 106 added can adopt a simple configuration as shown in FIG. 3 and FIG. 4. FIG. 3 is a block diagram showing an example of a configuration of the transmission path situation decision section shown in FIG. 2. FIG. 4 is a block diagram showing another example of the configuration of the transmission path situation decision section shown in FIG. 2.

As shown in FIG. 3, the transmission path situation decision section 106 can be constructed using a comparator 201 that compares the reception performance (e.g., BER) with a predetermined threshold. As a result, it is possible to decide the situation of the transmission path with a small amount of calculation.

That is, the transmission path situation decision section 106 having the configuration shown in FIG. 3 compares a previous value of reception performance with a threshold and can decide that the reception performance is bad, that is, the influence of fading is large when the reception performance value is greater than the threshold and decide that the reception performance is good, that is, the influence of fading is small when the reception performance value is smaller than the threshold.

Furthermore, as shown in FIG. 4, the transmission path situation decision section 106 can be constructed of a first comparator 301 that receives various values of reception performance (e.g., BER) as inputs and compares the values with a first threshold, a second comparator 302 that compares the reception performance values with a second threshold, a decision section 303 that receives the comparison results of the first comparator 301 and second comparator 302 and outputs a control signal and a storage section 304 that stores the control signal output from the decision section 303 and supplies it to the decision section 303 as the previous decision result.

According to this configuration, when the reception performance value is between the first threshold and second threshold, the decision section 303 outputs the output of the storage section 304 as a control signal; otherwise the decision section 303 outputs only the output of the first comparator 301 or only the output of the second comparator 302 as a control signal.

That is, when the transmission path situation decision section 106 in the configuration shown in FIG. 4 assumes that the first threshold is greater than the second threshold, it compares the previous reception performance value with the first threshold and second threshold, and when the reception performance value is greater than the first threshold, it is possible to decide that the reception performance is bad, that is, decide with high reliability that the influence of fading is large, and when the reception performance value is smaller the second threshold, it is possible to decide that the reception performance is good, that is, decide with high reliability that the influence of fading is small.

Then, when the reception performance value is smaller than the first threshold and greater than the second threshold, it is difficult to decide whether the reception performance is good or bad, that is, the reliability is low and it is not possible to decide whether the influence of fading is large or small, and therefore the decision may be made based on the previous decision result. That is, the transmission path situation decision section 106 in the configuration shown in FIG. 4 can decide the situation of the transmission path according to the previous decision result when it is difficult to decide the situation of the transmission path, and can thereby decide the situation of the transmission path with a small amount of calculation and further make a decision without excessive response to a tiny variation in the transmission path.

As shown above, this embodiment can change the number of calculations of adaptive processing according to the situation of the transmission path and reduce the amount of calculation averagely. Therefore, when the user of the receiver is in a stationary condition or when the influence of multi-path fading is weak, etc., it is possible, when the situation of the transmission path is decided to be very good, to reduce the estimated amount of calculation of the transmission path by a maximum of approximately 50% and contribute to a reduction of power consumption.

The present invention is not limited to the above described embodiments, and various variations and modifications may be possible without departing from the scope of the present invention.

This application is based on the Japanese Patent Application No. 2003-100210 filed on Apr. 3, 2003, entire content of which is expressly incorporated by reference herein.

What is claimed is:

1. An adaptive equalizer comprising:
   a first correlation section that calculates a cross-correlation between inputs of a received signal converted to a baseband signal and a known signal of said received signal which is known to a receiver before the reception;
   a second correlation section that calculates a correlation inverse matrix created from auto-correlation values obtained between said known signals;
   a matrix calculation section that receives the output of said first correlation section and the output of said second correlation section as inputs and carries out a matrix multiplication;
   a selection section that selects the output of said matrix calculation section and the output of said first correlation section;
   a correlation window size control section that changes the correlation window size of said first correlation section; and
   a transmission path situation decision section that decides the situation of the transmission path from the information indicating the previous reception performance and generates respective control signals indicating whether or not to cause said correlation window size control section to change the correlation window size, which output should be selected by said selection section and whether or not to cause said matrix calculation section to carry out a calculation operation.

2. The adaptive equalizer according to claim 1, wherein said transmission path situation decision section comprises a comparison section that compares previous reception performance with a predetermined threshold and decides the situation of the transmission path.

3. The adaptive equalizer according to claim 1, wherein said transmission path situation decision section comprises:
   a comparison section that compares the previous reception performance with predetermined two different thresholds; and
   a decision section that decides the situation of the transmission path according to the previous decision result when the previous reception performance can be decided to be positioned between said two thresholds from the output of said comparison section.

* * * * *